United States Patent [19]

Holmes

[11] 4,425,531
[45] Jan. 10, 1984

[54] ELECTRONIC FLASH UNIT ASSEMBLY

[76] Inventor: Ralph Holmes, 216 Diana Dr., Burley, Id. 83318

[21] Appl. No.: 298,368

[22] Filed: Sep. 1, 1981

[51] Int. Cl.³ .......................................... H05B 41/32
[52] U.S. Cl. ............................ 315/241 P; 354/126; 362/8; 362/11
[58] Field of Search .................. 315/241 P; 362/3, 8, 362/9, 11; 354/126, 132, 293

[56] References Cited

U.S. PATENT DOCUMENTS 4,045,808  8/1977  King .................................. 354/126

*Primary Examiner*—Eugene R. LaRoche
*Attorney, Agent, or Firm*—Alan M. Biddison; Joseph G. Seeber

[57] ABSTRACT

An electronic flash unit assembly having an electronic flash module separate from a power and control module. An assembly of articulated flash arms supports the flash module spaced from a camera. A power cord interconnects the power and control module with the flash module so that power is transmitted to the electronic flash tube from the power and control module when the power and control module is triggered. Preferably, a power cord connects the power and control module to the camera so that triggering of the module occurs upon movement of a shutter release member of the camera. The power and control module is connected to the tripod socket of the camera and supports the flash arm assembly. Alternatively, a mounting plate is connected to the tripod socket of the camera and supports the flash arm assembly, with the power and control module being in a separate unit.

6 Claims, 5 Drawing Figures

ELECTRONIC FLASH UNIT ASSEMBLY

BACKGROUND OF THE INVENTION

1. Field of the Invention

The present invention relates to electronic flash unit devices for use with photography. More particularly, the invention relates to an electronic flash unit assembly in which an electronic flash tube is spaced from a power and control module.

2. Description of the Prior Art

Electronic flash units connectable to photographic cameras are well known. Such units include a mounting foot for connecting the flash to a camera, a synchronization cord for connecting the unit to a synchronization terminal of the camera, a power source having a controllable variable output, and an electronic flash unit energized upon triggering of the power source. Alternatively, the flash units can be spaced from the camera and connected thereto by the synchronization cord.

A problem encountered with the use of such systems is that they are relatively large, when compared with the size of a camera. This creates a problem when it is desired to use previously known flash units for close-up or macro photography. With such photography, it is desirable to position the flash unit or units being used close to the object being photographed and to vary the orientation of the illumination axis with respect to the photographed object. Such variation in orientation is desirable in order to appropriately control shadows and high light areas illuminated by the flash device.

SUMMARY OF THE INVENTION

The present invention provides an electronic flash unit assembly in which a flash module containing an electronic flash tube is spaced from a power and control module. The power and control module is connectable to a camera and the flash module is spaced therefrom by an assembly of articulated flash arms. Since only the flash module need be supported, the required mass of the flash arms is relatively small. Thus, the flash module and flash arms significantly facilitate the use of electronic flash in macro photography.

One embodiment of the present invention provides a power and control module that is triggerable by a camera, a flash module containing an electronic flash tube that is connected by a power cord to the power and control module, and an assembly of articulated flash arms for supporting the flash module spaced from the power and control module. A power or synchronization cord provides means for operatively associating the power and control module with the flash module so that power is transmitted to the electronic flash tube from the power and control module when the power and control module is triggered, for instance by the operation of a camera shutter release member.

The electronic flash unit assembly is so designed that a first unit can be connected to the tripod socket of a camera and a second unit can be connected to the first unit. In this manner, it is possible to provide two sources of illumination on the same side of an object being photographed, or separate sources of illumination on opposite sides of the photographed object. Also, the angle between the illumination axes of the flash devices and the object can be selectively varied to provide optimum illumination of the photographed object.

In another embodiment, the electronic flash unit assembly includes a mounting bracket or plate connectable to a tripod socket of a camera, one or an assembly of articulated flash arms connected to the plate and supporting a flash module, and a power pack that is spaced from both the mounting plate and the flash module. The flash module is connected to the synchronization terminal of the camera and to the flash module so that the flash module is triggered by actuation of the camera shutter release member.

The connection between the flash arm or arms and the mounting plate or the power and control module can take several different forms. One type of connection is such that the flash arm or arms is movable in only one plane. Another type of connection utilizes a universal joint so that the flash arm assembly is movable in a horizontal plane, a vertical plane, or in a combination of horizontal and vertical directions. This type of connection is especially useful when exposing 35 mm negatives because the flash arm assembly is adjustable in the horizontal plane, regardless of whether the camera is held in a horizontal or vertical orientation.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

Because electronic flash devices and units are well-known, the present description will be directed in particular to elements forming part of, or cooperating more directly with, the present invention. Elements not specifically shown or described herein are understood to be selectable from those known in the art.

Figure 1:
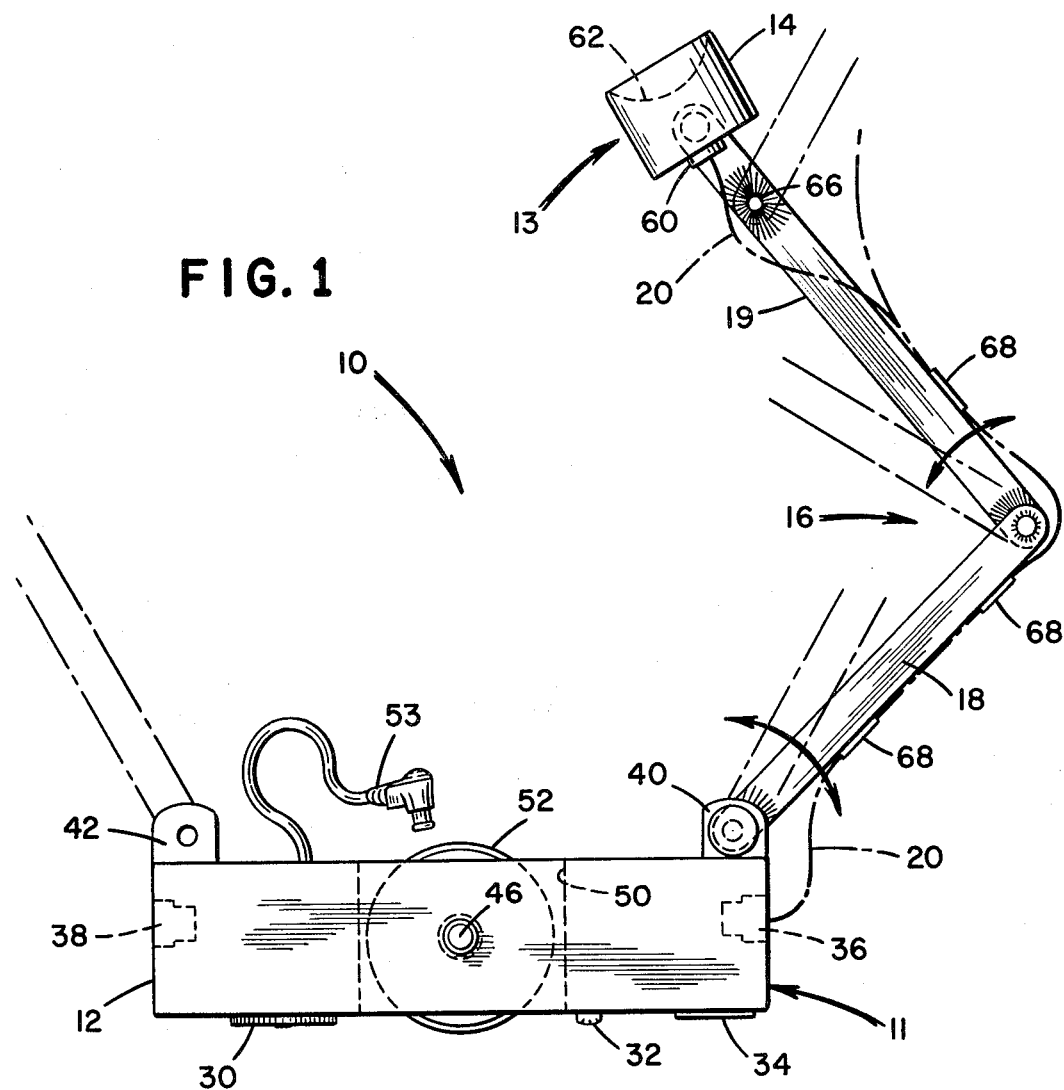
FIG. 1 is a top view of one embodiment of an electronic flash unit assembly according to the present invention.

Referring now to the drawings, and to FIG. 1 in particular, one embodiment of an electronic flash unit assembly according to the present invention is illustrated. The assembly, which is generally designated 10, includes a power and control module, generally designated 11, having a housing 12 containing a power source and suitable controls. A flash module, generally designated 13, has an electronic flash tube housing 14 connected to the housing 12 by an assembly 16 having one or a plurality of articulated flash arms, two flash arms 18 and 19 being illustrated. A power cord 20 has one end connected to the flash module 13 and one end connected to the power and control module 11 so that triggering of the power source of the power and control module results in firing of the electronic flash tube of the flash module 13.

Figure 2:
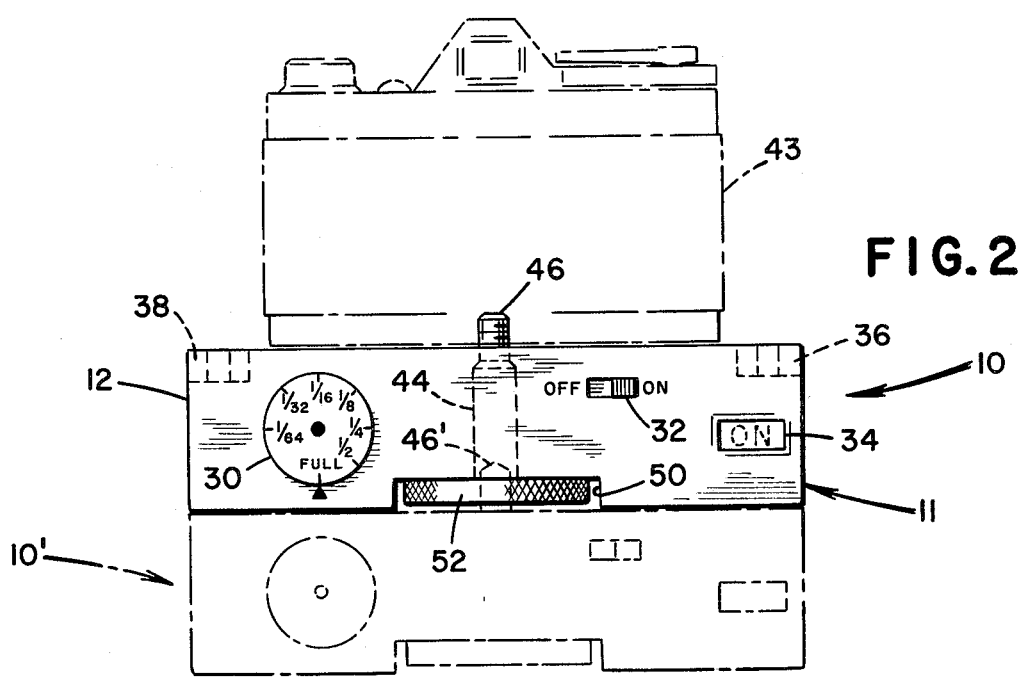
FIG. 2 is a rear view of a power and control module of the assembly illustrated in FIG. 1, connected to a tripod socket of a camera.

Referring now to FIGS. 1 and 2, the components of the power and control module 11 will be described in more detail. A power source having a controllable variable output is positioned within the housing 12 and has a power ratio dial 30 positioned on a rear surface of the housing 12. Rotation of the dial 30 varies the amount of power furnished to the flash module 13 to thereby control the level or amount of illumination supplied by the flash module. A control switch 32 is movable between an "OFF" and an "ON" position to control energization of the power source. A display unit 34, which can be a LCD display unit displaying the term "ON" or a light that is turned on or off, is provided to indicate readiness of the assembly 10 for a flash picture. Power cord receptacles 36 and 38, that are connected to the power supply within the housing, are positioned on right and left sides of the housing for receiving an end of the power cord 20. Flash arm brackets 40 and 42 protrude forwardly from right and left regions of a front surface of the housing, as best illustrated in FIG. 1. One end of flash arm 18 of the assembly 16 is connected to one of the brackets, for instance the bracket 40, as illustrated in solid lines, or the bracket 42, as illustrated in phantom. A distal end of the flash arm 19 is connected to the flash module 13. Preferably, the connections between the bracket, flash module, and assembly are all spring or friction loaded so that instant movement to and retention in any position is possible. Once in a desired position, there is sufficient friction within the various joints to hold the flash module in the set position.

A shaft 44 is received within the housing 12 and has a threaded end portion 46 that protrudes above a top planer surface of the housing. The end portion is designed to be threadedly engaged with a tripod socket of a camera 48. A lower surface of the housing 12 is recessed to receive a knob 52 of the shaft 44. The knob 52 has a threaded bore therein for receiving a threaded end portion 46' of a second electronic flash unit assembly 10'. As illustrated in FIG. 2, the top surface of the housing is flush with the bottom surface of the camera 48 and the bottom surface of the housing is flush with the top surface of the second unit 10'. Thus, a plurality of units can be supported by one camera in a superposed relationship.

A synchronization cord 53 is provided for connecting the power and control module II to a synchronization terminal of the camera 48. It will be appreciated that either a portion of the cord 53 or the module 1 will have to be appropriately modified to allow interconnection between superposed units connected to the camera.

The flash module 13 includes a power cord receptacle 60 for receiving one end of the power cord 20 and a reflector 62 for focusing the illumination of the electronic flash tube contained within the housing 14. One or more of the flash arms, such as flash arm 19, is provided with a threaded opening 66 so that at least one additional flash arm can be articulated from the assembly 16. When photographing large objects, such as a large map or print, it is preferable to use several articulated flash arms so that the flash module is positioned an increased distance away from the camera. One or more cord clips 68 are formed integral with or attached to the flash arms for connecting portions of the power cord 20 to the assembly 16. When more than one unit or flash module 13 is supported by an assembly 16, appropriate provision must be made for operatively associating each of the flash modules 13 with the module 11.

Considering now the use of the embodiment of the present invention illustrated in FIGS. 1 and 2, and electronic flash unit assembly 10 is connected to a camera 48 by rotating knob 52 so that threaded end portion 46 engages the tripod socket of camera 48. Also, the synchronization cord 53 is connected to the camera. The assembly 16 is then appropriately moved to position the flash module 13 in a desired position with respect to the article or articles to be photographed. The desired output of the flash module 13 is calculated and the power ratio dial 30 rotated to appropriately adjust the output of the power unit contained within the power and control module 11. Control switch 32 is moved to the "ON" position. When the display unit 34 given an appropriate readiness signal, the flash unit assembly 10 is ready for operation. Operation of a shutter release member of the camera 48 then triggers the power and control module 11 which, in turn, powers the flash module 13 so that the electronic flash tube is fired. If additional illumination is required, a second electronic flash unit assembly 10' is connected to the first unit 10. Alternatively, a second assembly of articulated flash arms 16 and a second flash module 13 are connected to the module 11 opposite the first assembly 16. It should be readily appreciated that whether one or two units is required is a function of the available power of the power supply unit incorporated in the power and control module 11.

Figure 3:
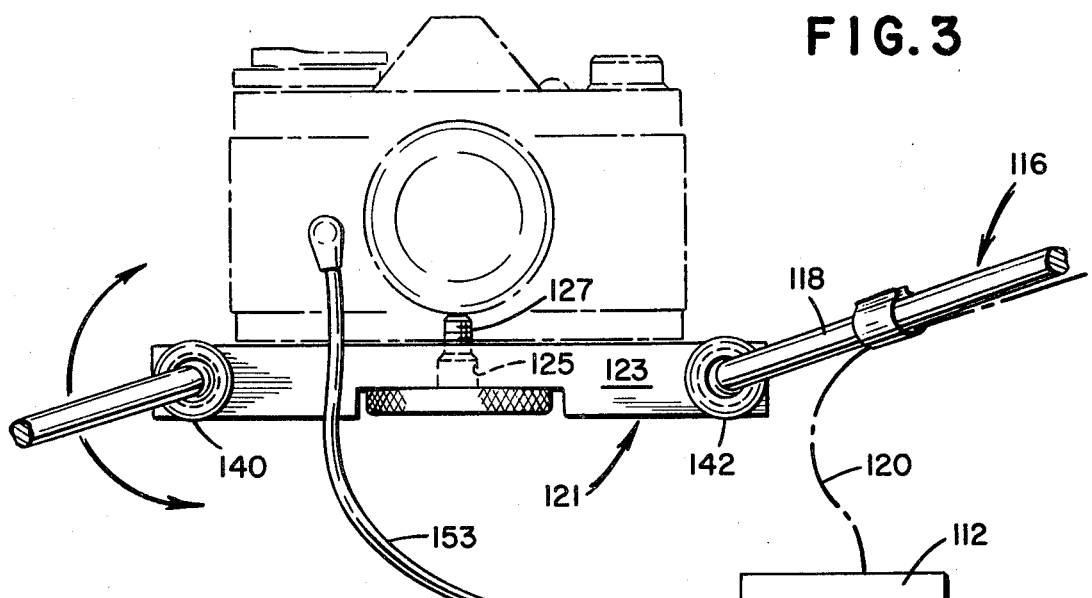
FIG. 3 is a front view of another embodiment of an electronic flash unit assembly according to the present invention connected to a tripod socket of a camera.
Figure 4:
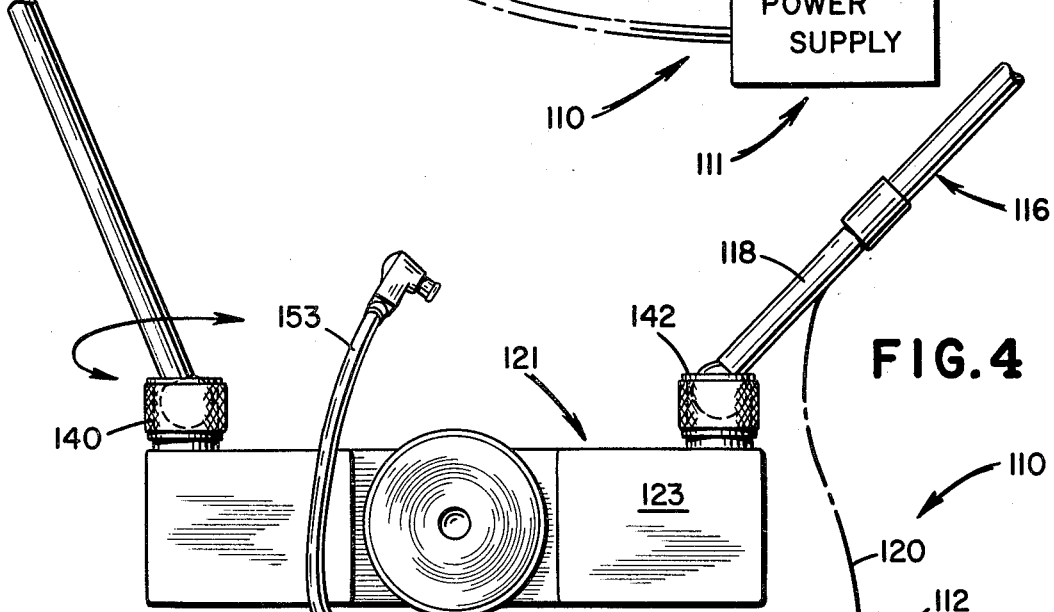
FIG. 4 is a bottom view of the assembly of FIG. 3.

Referring now to FIGS. 3 and 4, a second embodiment of the invention is illustrated. This embodiment of the invention provides a flash unit assembly, generally designated 110, comprised of a power and control module 111 having a housing 112 containing a power supply or source and conventional controls. Preferably, the output of the power source is selectively variable, as with the embodiment illustrated in FIGS. 1 and 2. A flash module similar to the module 13, has an electronic flash tube housing connected to the housing 112 by a power cord 120 so that triggering of the power source within the housing 112 results in firing of the electronic flash tube of the flash module. A synchronization cord 153 is provided for connecting the power and control module 111 to a synchronization terminal of a camera so that actuation of a shutter release member of the camera triggers the power source.

The flash tube housing is connected by an assembly 116 of one or more articulated flash arms, one of whih designated 118 is illustrated, to a mounting bracket or plate assembly, generally designated 121. The assembly 121 has a generally rectangular shaped plate 123 with a through bore 125 formed therein. A threaded shaft 127 extends through the bore 125 and has an end portion thereof engageable with a tripod socket of the camera. Bracket assemblies 140 and 142 are connected to the plate 123 and extend forwardly from its right and left sides when the plate is connected to the camera. Each of the bracket assemblies forms a ball and socket type joint for associating or connecting an end of the assembly 116 to the plate 123. Such joint makes it possible to change both the horizontal and vertical orientation of the flash module with respect to the camera. For example, when exposing 35 mm film, the camera can be positioned such that the film is oriented with its long dimension horizontal or vertical, and the flash module positioned to provide appropriate illumination of the object being photographed. The flash module is also positionable to provide illumination of the photographed object from any desired angle. Thus, the assembly 116 and the bracket assemblies 140 and 142 provide means for adjustably connecting the flash module with the plate 123 so that the position of the flash module is horizontally and vertically adjustable with respect to the plate.

It should be readily apparent that an assembly 116 and flash module can be connected to one or both of the bracket assemblies 140 and 142 at a given time. Should two flash modules be used, the housing 112 would be provided with two power cords 120. Alternatively, the housing 112 would be connected to the plate 123, and the plate 123 would include an appropriate power synchronization cord connectable to the camera and power terminals for receiving ends of the power cords 120.

Figure 5:
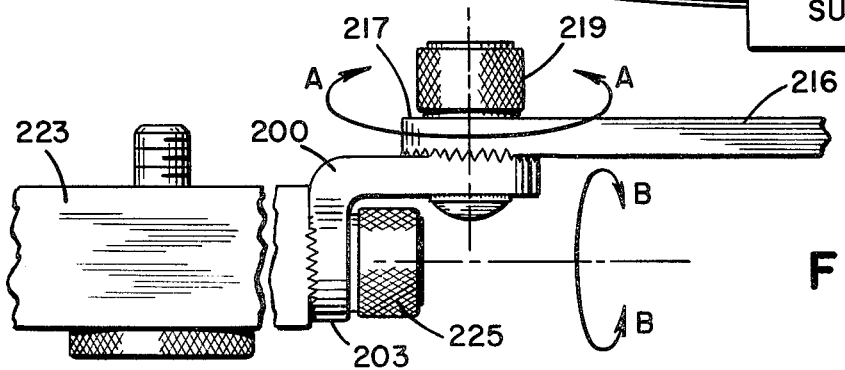
FIG. 5 is an enlarged side view of a portion of still another embodiment of an electronic flash unit assembly according to the present invention.

Referring now to FIG. 5, a modification of the previously described embodiments of the present invention is illustrated. This modification provides a relatively simple mounting bracket 200 that provides substantially universal adjustment of a flash arm assembly 216 having one end portion connected to a flash module (not shown) and one end portion 217 connected by the bracket 200 to a mounting bracket 223 similar to the plate 123. The bracket 200 is also usable with the power and control module 11 illustrated in FIGS. 1 and 2. The bracket 200 has one leg 201a with a serrated surface engageable with a serrated surface of the end portion 217. A nut and bolt assembly 219 is movable between a release position in which the end portion 217 is rotatable with respect to the bracket, as illustrated by the arrows A, and a locking position in which the orientation of the end portion is fixed with respect to the bracket.

A second arm 203 of the bracket 200 has a serrated surface engageable with a serrated surface of the plate 223 to fix the angular orientation of the bracket with respect to the plate. A bolt 225 is received in a threaded bore formed in the plate 223 and is movable between a released position, in which the leg 203 is rotatable, as indicated by the arrows B, and a locking position, in which the angular orientation of the leg 203 is fixed. Since adjustment is provided in both horizontal and vertical directions, the bracket 200 and associated components, together with the flash arm assembly 216, provide means for positioning the flash module in any desired orientation with respect to the camera.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. An electronic flash unit assembly connectable to and triggerable by a camera comprising:
   (a) a triggerable power and control module connectable to a camera and having:
      (1) a housing containing a power source with a controllable variable power output,
      (2) means for connecting the power source to a camera so that operation of the camera triggers the power source,
      (3) power cord receptacles connected to said power source provided in right side and left side surfaces of said housing,
      (4) a first bracket protruding forwardly from a right front surface of the housing,
      (5) a second bracket protruding forwardly from a left front surface of the housing, and
      (6) a shaft received in said housing and having a threaded end portion protruding above a top surface of the housing for connecting the housing to the camera;
   (b) a flash module containing an electronic flash tube,
   (c) an assembly of articulated flash arms for supporting said flash module spaced from said power and control module, said assembly having one end articulated to said flash module and one end articulated to one of said first and said second brackets; and
   (d) power cord means carried by said assembly for furnishing power to the electronic flash tube when the power source is triggered and having one end connected to said flash module and one end connected to one of said power cord receptacles.

2. The electronic flash unit assembly according to claim 1, wherein the assembly of articulated flash arms includes a plurality of flash arms for spacing the flash module an increased distance from the camera.

3. An electronic flash unit assembly for use with a camera comprising:
   a triggerable power and control module;
   a flash module containing an electronic flash tube;
   at least one flash arm for supporting said flash module spaced from said camera; and
   means for operatively associating said power and control module with said flash module and the camera so that power is transmitted to the electronic flash tube from said power and control module when said power and control module is triggered by operation of the camera;
   wherein an assembly of a plurality of articulated flash arms supports said flash module; and
   wherein said means for operatively associating comprises a first power cord for interconnecting said power and control module with said flash module and a second power cord for interconnecting said power and control module with the camera, and wherein said power and control module comprises a housing connectable to a tripod socket of the camera, a power source having a controllable variable output disposed within said housing, receptacles for an end of said first power cord formed on opposed sides of said housing, and first and second bracket means for connecting an end of said assembly of articulated flash arms to said housing, one of said first and second bracket means being associated with each of said receptacles.

4. An electronic flash unit assembly for use with a camera comprising:
   a triggerable power and control module;
   a flash module containing an electronic flash tube;
   at least one flash arm for supporting said flash module spaced from said camera; and
   means for operatively associating said power and control module with said flash module and the camera so that power is transmitted to the electronic flash tube from said power and control module when said power and control module is triggered by operation of the camera;
   wherein an assembly of a plurality of articulated flash arms supports said flash module; and
   wherein said means for operatively associating comprises a first power cord for interconnecting said power and control module with said flash module and a second power cord for interconnecting said power and control module with the camera, and wherein said power and control module comprises a housing and a power source having a controllable variable output disposed within said housing, said assembly further comprising a mounting bracket connectable to a tripod socket of the camera, and first and second bracket means for connecting an end of said assembly of articulated flash arms to said mounting bracket.

5. An electronic flash unit assembly for use with a camera comprising:

a triggerable power and control module;

a flash module containing an electronic flash tube;

at least one flash arm for supporting said flash module spaced from said camera; and means for operatively associating said power and control module with said flash module and the camera so that power is transmitted to the electronic flash tube from said power and control module when said power and control module is triggered by operation of the camera;

wherein an assembly of a plurality of articulated flash arms supports said flash module; and wherein said power and control module comprises:

a housing having planar top and bottom surfaces and a recesed portion centrally located in the bottom surface, a shaft received in said housing and having a threaded end portion protruding above the housing top surface engageable with a camera tripod socket, and a knob positioned in said recessed portion for rotating said shaft, said knob having a threaded bore formed therein for receiving a threaded end portion of a second electronic flash unit assembly to thereby releasably connect the second electronic flash unit to said knob.

6. The electronic flash unit assembly of claim 5, wherein said housing has side surfaces provided with power cord receptacles, wherein said housing has brackets protruding forwardly from right and left regions of a front surface thereof for selectively connecting an end of said assembly of articulated flash arms to one of said brackets, and wherein said means for operatively associating comprises a first power cord having one end connected to one of said power cord receptacles and one end connected to said flash module.

* * * * *